April 8, 1924. 1,489,320
H. GOODMAN
DIRIGIBLE HEADLIGHT FOR AUTOMOBILES
Filed Dec. 12, 1922    2 Sheets-Sheet 1
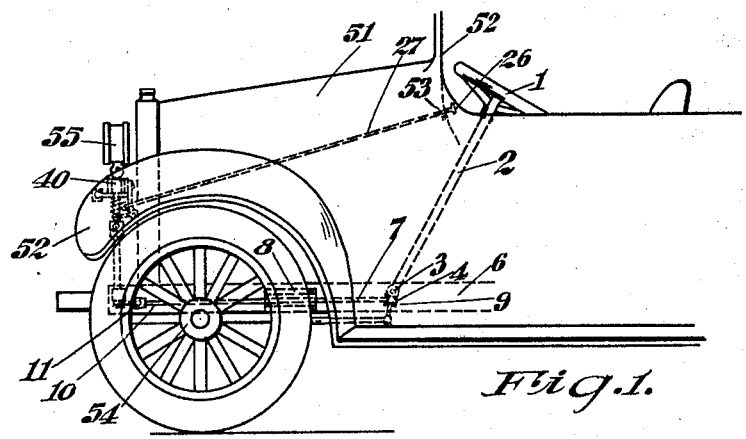
Fig.1.
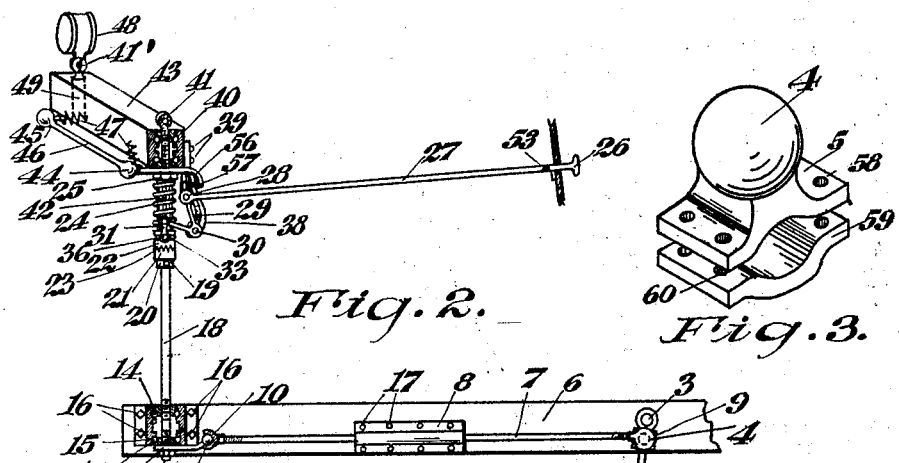
Fig.2.    Fig.3.
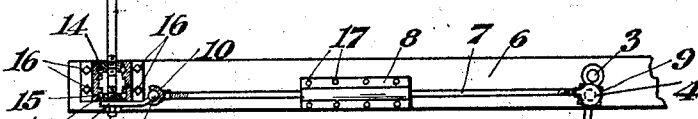
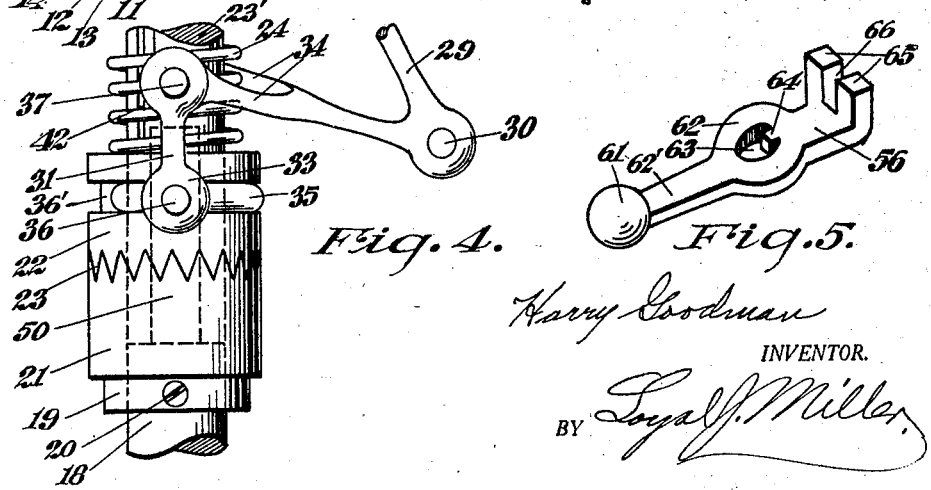
Fig.4.    Fig.5.
Harry Goodman
INVENTOR.
BY Loyal J. Miller
ATTORNEY.

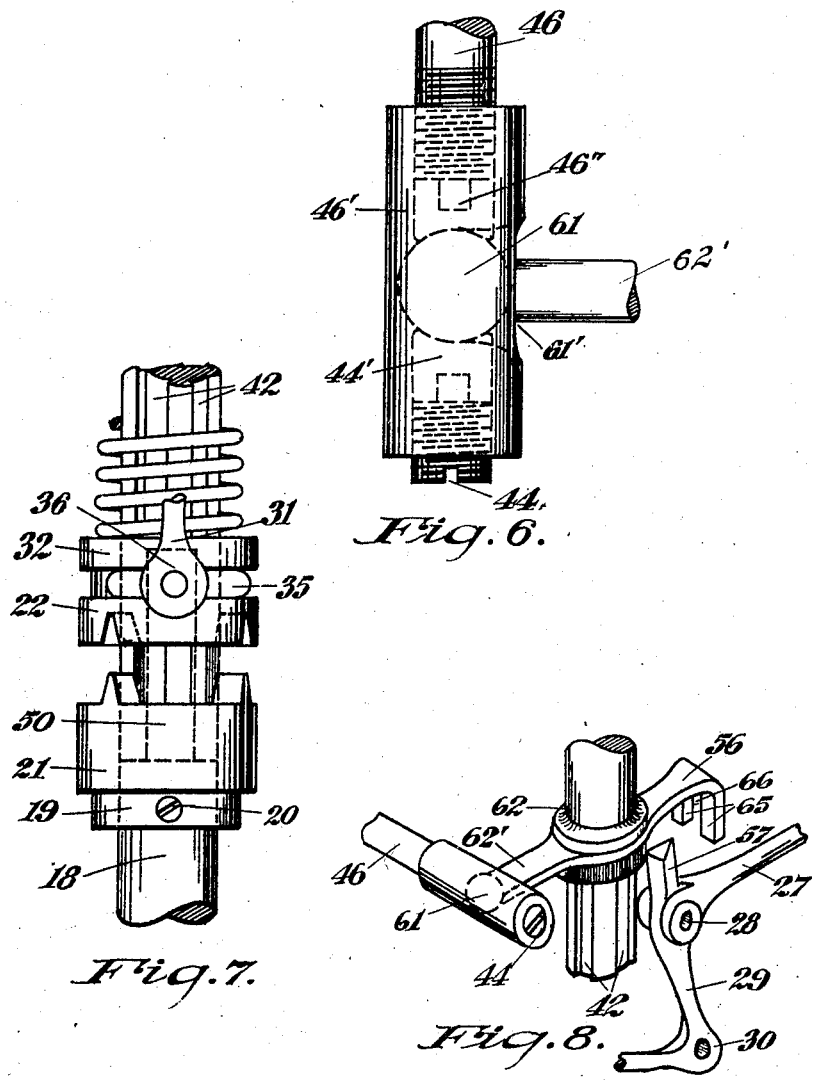

Patented Apr. 8, 1924.

1,489,320

UNITED STATES PATENT OFFICE.

HARRY GOODMAN, OF OKLAHOMA CITY, OKLAHOMA.

DIRIGIBLE HEADLIGHT FOR AUTOMOBILES.

Application filed December 12, 1922. Serial No. 606,376.

*To all whom it may concern:*

Be it known that HARRY GOODMAN, a citizen of the United States, residing at Oklahoma City, in the county of Oklahoma and State of Oklahoma, has invented certain new and useful Improvements in Dirigible Headlights for Automobiles, of which the following is a specification.

This invention relates to automobiles, and has special reference to a dirigible head light for automobiles.

One important object of the invention is to improve the general construction of the devices of this character.

A second important object of the invention is to provide an improved dirigible head light for automobiles wherein the head lights may be actuated from the steering wheel, or may be disconnected therefrom at will.

A third important object of the invention is to provide improved means for automatically locking the head lights in central position when disconnected from the steering wheel or column.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a portion of the front end of an automobile showing the device applied thereto.

Figure 2 is a detail view showing the mechanism partly in perspective.

Figure 3 is a view of part of certain ball and socket connection with the steering column.

Figure 4 is a side elevation of the means for clutching and unclutching the head lights from the actuating means.

Figure 5 is perspective view of a certain locking fork used in connection herewith.

Figure 6 is a plan view of a certain ball and socket joint used in connection with the invention.

Figure 7 is a view somewhat similar to Fig. 4, but showing the parts unclutched, the view also presenting a modification of the mechanism shown in Fig. 4.

Figure 8 is a detail perspective view of the automatic locking mechanism.

In the embodiment of the invention herein shown, there is disclosed a steering wheel 1 carried by the usual steering shaft 2. At the lower end of the shaft 2, there is provided a ball and socket connection, the ball portion of the connection being carried on an arm 3 projecting from the shaft 2, and shown in detail in Fig. 3.

It will be seen from this figure, that there is provided a ball 4, which is carried on a clamping member 5, having bolt or screw openings 58 therein. A second clamping member 59 cooperates with the first clamping member, and is provided with bolt or screw openings 60 so that the bolts or screws may be passed through the openings 58 and 60, and securely clamping the ball in position. This ball fits in a socket 9 in the end of a reach rod 7 which passes forwardly through a guide 8 secured to one of the frame members 6 of the automobile by means of bolts 17. At the forward end of the rod 7 is a socket 10 which engages a ball 11 on the end of an arm 12 fixed to the lower end 13 of a shaft which passes through a bearing 14 formed in a bracket 15 secured to the frame of the automobile by bolts 16. The shaft, the lower end of which is shown at 13, extending beyond said bracket 15 as is shown at 18 and fixed thereon is a clutch member 21, set screw 20 being used to hold the clutch member 21 in position. The upper end of this clutch member 21 is enlarged to correspond in diameter with a sliding clutch member 22 provided with teeth cooperating with the clutch member 21, such teeth being shown in Fig. 4 at 23. This sliding member 22 is mounted on an upper shaft section 23' having a clutch in its lower end to receive the reduced upper end 50 of the shaft 18.

Moreover this upper shaft member 23' is provided with key grooves 42, and the sliding clutch member 22 is grooved to correspond therewith so that rotation of the clutch member 22 will also rotate the shaft 23'. Ordinarily, the clutch member 22 is kept in engagement with the clutch member 21 by spring 24 which bears at its upper end on a collar 25 carried on the upper shaft section 23'. Extending through the dash board of the machine or instrument board is a button 26 which is connected by a flexible joint 53 with a rod 27 which passes under the hood 51. This rod 27 is connected on its forward end to an arm 29 by a pin 28, this arm pivoting at a pivot 30 supported on the downwardly extending end of a bracket 38. On the arm 29 is also formed a fork 34 which carries pivot members 37 from which depend links 31 having eyes 33 at their lower ends engaging the pivots 36 of a shipper ring 35 carried in the groove 36′ formed in the member 22. Thus by pulling on the button 26 the bell crank consisting of the arm 29 and fork 34 is rotated on its pivot 30 and moves the clutch member 22 out of engagement with the clutch member 21.

Fixed on the shaft section 23′ is a hub 62 from which extends forwardly an arm 62′ having on its extremity a ball 61 which enters a lateral slot 61′ formed in a sleeve 46′ carried on the end of a shaft or link 46. This shaft or link 46 has on its inner end, within the sleeve 46′, a clutch member 46″. Screwed into the other end of the sleeve 46′ is a cap screw 44 carrying on its inner end a socket member 44′. The two socket members just mentioned cooperate with the ball 61 to hold these parts together. Extending rearwardly from the hub 62 is an arm 56 having downwardly turned forked arms 65 spaced to provide a slot 66 so that a wedge-shaped extension 57 on the end of the arm 29 will engage between said forked arms when the button 26 is pulled. Thereby the arms 56 and 62′ will be locked in position when the clutch is disengaged. On top of the shaft section 23′ is secured one of the lamps 55. The other lamp 48 is mounted on top of a vertical shaft 49 having an arm 45 extending therefrom and connected by a ball and socket joint with the rod 46. At 47 are springs which are connected respectively to the arms 62′ and 45 so that whenever the clutch is released these springs act to bring the lamps 48 and 55 into central position where they may be locked by the action of the extension 57 as just described.

It will be noted that the lamps are secured to their respective shafts by joints indicated at 41 and 41′.

Said shaft joints are each composed of a semi-circularly topped flat-sided member having corrugated or other rough surfaces on each flat side, said corrugations fitting into like corresponding surfaces on the inside of like members attached to and extending below the lights, said rough surfaces adjustably clamping together by a set-screw, or other suitable member, so as to change the position of the rays of light up or down.

In the operation it will be seen from the foregoing that under ordinary circumstances the clutch members 22 and 21 will cause rotation of the lamp supporting shafts 23′ and 49, being usually in engagement. However, when it is desired to operate the steering wheel 1 without moving the lamps, the button 26 is pulled, which disengages the clutch whereupon the springs 47 bring the lamps to central position and the extension 57 locks them in said central position.

There has been provided a simple novel and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a pair of headlight supporting shafts, an extension for one of said shafts alined therewith and revoluble with respect thereto, means to connect the pair of shafts for movement in unison, a clutch member fixed on said extension, a second clutch member splined for longitudinal movement on one of the pair of shafts and cooperating with the first clutch member, an arm carried by the shaft on which the clutch member is splined and having a forked end, an operating lever for moving the certain member longitudinally on its shaft, spring means normally urging said headlights to central position whereby upon unclutching the shaft extension said headlights will automatically assume such central position, an arm projecting from the shaft whereon the second clutch member is splined and provided with a forked end, and an extension on the operating lever arranged to enter said fork upon movement of the operating lever to unclutching position and thereby lock the headlights in central position.

2. In a device of the kind described, a pair of headlight supporting shafts having at the top of each a semi-circularly topped flat-sided member with corrugations, or similar rough surfaces on each flat side, said surfaces fitting into like corresponding surfaces on the inside of like members extending below the lights, said rough surfaces adjustably clamping together by a set screw or other suitable member, an extension for one of said shafts alined therewith and revoluble with respect thereto, means to connect the pair of shafts for movement in unison, a clutch member fixed on said extension, a second clutch member splined for longitudinal movement on one of the pair of shafts and co-operating with the first clutch member, an arm carried by the shaft on which the clutch member is splined and having a forked end, an operating lever for moving the certain clutch member longitudinally on its shaft, spring means normally urging said headlights to central position whereby upon unclutching the shaft extension said headlights will automatically assume such central position, an arm projecting from the shaft whereon the second clutch member is splined and provided with a forked end, and an extension on the operating lever arranged to enter said fork upon movement of the operating lever to unclutching position and thereby lock the headlights in central position.

HARRY GOODMAN